United States Patent [19]

Madewell

[11] Patent Number: 4,507,609

[45] Date of Patent: Mar. 26, 1985

[54] APPARATUS FOR NONDESTRUCTIVELY MEASURING THE THICKNESS OF A MAGNETIC FLUX CONDUCTIVE CLAD MATERIAL OVER A MAGNETIC FLUX CONDUCTIVE BASE MATERIAL OF A DIFFERENT PERMEABILITY

[75] Inventor: George R. Madewell, Soddy, Tenn.

[73] Assignee: Combustion Engineering, Inc., Windsor, Conn.

[21] Appl. No.: 322,304

[22] PCT Filed: Oct. 14, 1981

[86] PCT No.: PCT/US81/01388

§ 371 Date: Nov. 16, 1981

§ 102(e) Date: Nov. 16, 1981

[51] Int. Cl.³ .................... G01B 7/10; G01R 33/12
[52] U.S. Cl. .................................................. 324/230
[58] Field of Search ................................. 324/228–231

[56] References Cited

U.S. PATENT DOCUMENTS

| | | | |
|---|---|---|---|
| 2,226,275 | 12/1940 | Abbott et al. | 324/229 |
| 2,320,761 | 6/1943 | Tait et al. | 324/230 X |
| 2,595,380 | 5/1952 | Hudson | 324/230 |
| 3,747,085 | 7/1973 | Bala et al. | 324/208 X |

FOREIGN PATENT DOCUMENTS

| | | | |
|---|---|---|---|
| 888093 | 12/1943 | France | 324/230 |
| 460991 | 3/1937 | United Kingdom | 324/230 |
| 501333 | 2/1939 | United Kingdom | 324/230 |

OTHER PUBLICATIONS

Hole, J. E., Magnetic Reluctance, Film Thickness Gauge, IBM Tech. Discl. Bull., vol. 13, No. 10, Mar. 1971, pp. 3048, 3049.

Primary Examiner—Gerard R. Strecker
Attorney, Agent, or Firm—David L. Smith

[57] ABSTRACT

A system (10) for determining the thickness of a magnetic flux conductive clad material over a magnetic flux conductive base material of different permeability applies on alternating voltage (96) to the primary winding (52) of an incomplete core-type transformer (54). The secondary winding (40) voltage to primary winding (52) voltage ratio is determined with the material being clad-thickness measured (56) completing the incomplete core (54). The voltage ratio is a nondestructive measurement of the thickness (64) of the clad material. The preferred embodiment applies a constant voltage alternating voltage power source (18) to the primary winding (52). This obviates the need to determine the ratio of voltages. The secondary winding (40) voltage is a direct nondestructive measurement of the thickness (64) of the clad material. By reference to a particular clad material-base material chart, the clad thickness is read from the scale adjacent the intersection of the voltage induced in secondary winding (40) and the curve (78,80,82,84,86,88,90,92,94) representing the composition of the clad material.

3 Claims, 3 Drawing Figures 4,507,609

APPARATUS FOR NONDESTRUCTIVELY MEASURING THE THICKNESS OF A MAGNETIC FLUX CONDUCTIVE CLAD MATERIAL OVER A MAGNETIC FLUX CONDUCTIVE BASE MATERIAL OF A DIFFERENT PERMEABILITY

BACKGROUND OF THE INVENTION

This invention relates to nondestructive testing of metals and in particular to the thickness measurement of a magnetic flux conductive base material that has been applied over a magnetic flux conductive base material of a permeability different from the permeability of the clad material.

Vessels, piping and other parts used in the nuclear, petrochemical, and other industries that require corrosion or heat protection are often fabricated of a clad material, chosen for its particular properties, over a base material. The clad construction is more economical than fabricating the entire vessel, pipe or other part entirely from the clad material. The clad material is often applied to the base material of the vessel, pipe or other part by a welding process after which the clad material is machined or ground to form the final surface. Although the original clad thickness can be estimated from the particular welding process used to apply the clad material, it is difficult to estimate the thickness of clad material remaining after machining or grinding.

Ultrasonic methods have been used to measure the thickness of clad material by detecting the interface between the clad material and the base material. Ultrasonic methods detect the interface better when the clad material is not applied well to the base material than when the clad material is applied well to the base material. The more desirable condition where the clad material is applied well to the base material does not result in reliable ultrasonic determination of the thickness of the clad material.

A method of determining clad thickness by pulling a magnet resting on the surface normal to the surface of a clad material that has been applied over a base material has also been used. This method measures the breakaway force and correlates that force to clad thickness. This method of determining clad thickness is limited to applications where the permeability of the clad material is low and the permeability of the base material is high.

Therefore, a need exists for a nondestructive method and apparatus for determining the thickness of a magnetic flux conductive clad material that has been applied over a magnetic flux conductive base material of a permeability different from the permeability of the clad material.

SUMMARY OF THE INVENTION

The present invention uses a core-type transformer to nondestructively determine the thickness of a magnetic flux conductive clad material. The invention has application where the magnetic flux conductive clad material has been applied over a magnetic flux conductive base material and the permeability of the clad material is different from the permeability of the base material. The primary and secondary windings of the core-type transformer are interlinked by a mutual magnetic field conducted through an incomplete core and the material being clad-thickness measured. The three legs of the incomplete core are ferromagnetic and form a U-shape with an air gap between the ends of two legs. The flux path is completed by placing the magnetic flux conductive material being clad-thickness measured across the air gap.

An alternating voltage is applied to the primary winding of the core-type transformer. The primary and secondary windings of the core-type transformer are interlinked by a mutual magnetic field conducted through an incomplete core and the material being clad-thickness measured. The magnitude of the voltage induced in the secondary winding is dependent on the magnitude of the voltage applied to the primary winding, the ratio of the number of turns in the secondary winding to the number of turns in the primary winding and the reluctance of the flux path.

A ratio of the magnitude of voltage induced in the secondary winding to the magnitude of voltage applied to the primary winding is a nondestructive measurement of the thickness of the clad material. The turns ratio remains constant. Normalizing the voltage induced in the secondary winding by the magnitude of the voltage applied to the primary winding makes the voltage ratio independent of the magnitude of the voltage applied to the primary winding. Thus, the voltage ratio is independent of changes in the voltage applied to the primary winding. For a known turns ratio, the voltage ratio is then dependent only on the reluctance of the flux path.

The reluctance of the ferromagnetic incomplete core is constant. The reluctance of the material being clad-thickness measured is dependent on the composition of the clad material, the thickness of the clad material and the composition of the base material. Each combination of the three variables, composition of clad material, thickness of clad material and composition of base material causes a predictable voltage ratio. Knowing the composition of the clad material and the composition of the base material, the voltage ratio is a nondestructive measurement of the thickness of the clad material.

The thickness of the clad material is determined by reference to a particular clad material-base material voltage ratio chart on the scale adjacent the intersection of the voltage ratio and the composition of the clad material. The clad material-base material voltage ratio charts are made using a number of test blocks for which the composition of the clad material, the thickness of the clad material and the composition of the base material are known. For a given composition of the base material, the test blocks span a range of clad material compositions and a range of clad material thicknesses. The voltage ratio is recorded when a voltage is applied to the primary winding and each test block, one at a time, is placed across the air gap of the incomplete core-type transformer. The voltage ratio ranges from zero to the turns ratio.

The incomplete core is made of flat U-shaped ferromagnetic laminations that stack to a specific depth. The ends of the incomplete core that are placed in contact with the material being clad thickness measured are tapered substantially perpendicular to the plane of any one of the laminations. The tapered ends form a V-shape having a line segment the depth of the stacked laminations at the end of the V-shape. A wear resistance material is inserted at the end of the taper for the entire depth of the core to prevent the laminations from wearing. The taper concentrates the lines of flux where the incomplete core contacts the material being clad-thickness measured. The distance between the wear resistant inserts establishes a specific length of the material to be clad-thickness measured through which a magnetic field is established. The depth of the incomplete core establishes the width of the magnetic field. All core-type transformers to be used with the same clad material-base material chart must have the same distance between the wear resistant inserts, must have the same incomplete core depth and should have the same V-shape taper.

A preferred embodiment applies an alternating voltage of known magnitude and frequency to the primary winding thereby inducing a voltage in the secondary winding. The voltage applied to the primary winding is maintained constant at a known value. This obviates the need to normalize the voltage induced in the secondary winding by the voltage applied to the primary winding. The magnitude of the voltage induced in the secondary winding can be used directly.

The magnitude of the voltage induced in the secondary winding is dependent on the magnitude of the voltage applied to the primary winding, the ratio of the number of turns in the primary winding to the number of turns in the secondary winding and the reluctance of the flux path. The magnitude of the voltage applied to the primary winding, the turns ratio, and the reluctance of the three ferromagnetic legs of the incomplete core remain constant. The material being clad-thickness measured provides two parallel flux paths, each with a different reluctance. The equivalent reluctance of the parallel flux paths is dependent on the composition of the clad material, the thickness of the clad material and the composition of the base material. Each combination of the three variables, composition of clad material, thickness of clad material and composition of base material, causes a predictable voltage to be induced in the secondary winding for a known turns ratio and a known voltage applied to the primary winding. Knowing the composition of the clad material and the composition of the base material, the voltage induced in the secondary winding is a non-destructive measurement of the thickness of the clad material.

The thickness of the clad material is determined by reference to a particular clad material-base material chart on the scale adjacent the intersection of the voltage induced in the secondary winding and the composition of the clad material. The clad material-base material charts are made using a number of test blocks for which the composition of the clad material, the thickness of the clad material and the compositin of the base material are known. For a given composition of the base material, the test blocks span a range of clad material compositions and a range of clad material thicknesses. The voltage induced in the secondary winding is recorded when a known voltage is applied to the primary winding and each test block, one at a time, is placed across the air gap of the incomplete core-type transformer.

An incomplete core-type transformer is useful to determine clad-thickness up to one-half the distance between the wear resistant inserts.

DESCRIPTION OF THE PREFERRED EMBODIMENT

Figure 1:
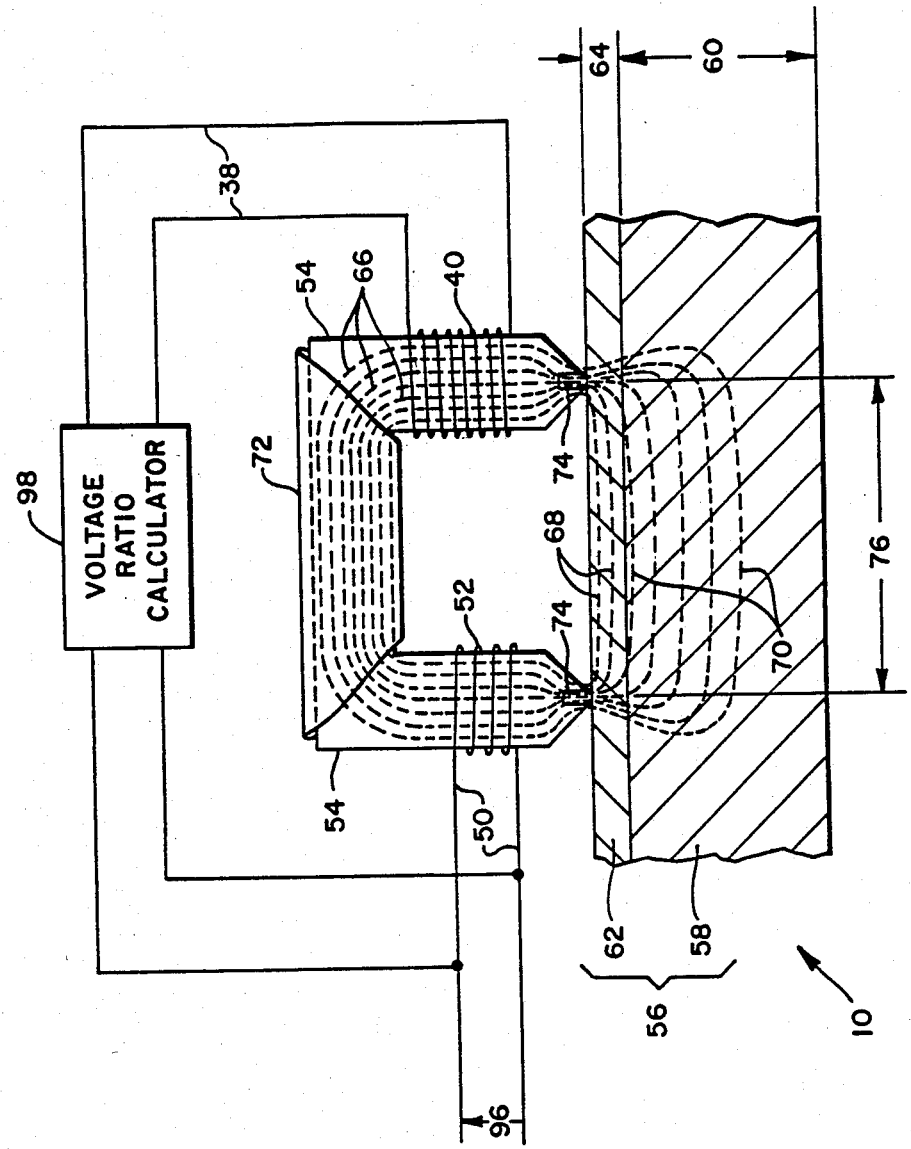
FIG. 1 is a schematic diagram of the electrical circuitry associated with the incomplete core-type transformer and a side view of the incomplete core-type transformer showing representative magnetic lines of flux passing through the core, the wear resistant inserts, the clad material and the base material; .

FIG. 1 is a schematic diagram showing clad thickness measuring apparatus 10. Leads 50 connect primary winding 52 to alternating current voltage source 96 and voltage ratio calculator 98.

Primary winding 52 is shown surrounding a portion of incomplete core 54. A voltage applied across primary winding 52 causes a current to flow in primary winding 52 which in turn causes a magnetic field to be established in incomplete core 54. The magnetic flux circuit is completed by the material being clad-thickness measured 56. The material being clad-thickness measured 56 consists of base material 58 of base material thickness 60 and clad material 62 of clad material thickness 64. Substantially all lines of flux 66 pass through incomplete core 54. To complete the magnetic circuit, a portion of lines of flux 66, lines of flux 68, pass through clad material 62. The remainder of lines of flux 66, lines of flux 70, pass through clad material 62, through base material 58 and through clad material 62 again.

Leads 38 connect secondary winding 40 to voltage ratio calculator 98.

Voltage ratio calculator 98 provides a ratio of the magnitude of the voltage induced in secondary winding 40 to the magnitude of the voltage applied to primary winding 52. This voltage ratio is a nondestructive measurement of the thickness 64 of the material 62. Primary winding 52 has 300 turns and secondary winding 40 has 600 turns. The turns ratio remains constant. Normalizing the voltage induced in secondary winding 40 by the magnitude of the voltage applied to primary winding 52 makes the voltage ratio independent of the magnitude of the voltage applied to primary winding 52. Thus, the voltage ratio is independent of changes in the voltage of voltage source 96.

For a known turns ratio, the voltage ratio is dependent only on the reluctance of the flux path. The reluctance of incomplete core 54 is constant. The reluctance of material being clad-thickness measured 56 is dependent on the composition of the clad material, the thickness of the clad material and the composition of the base material. Each combination of these three variables, composition of clad material, thickness of clad material and composition of base material causes a predictable voltage ratio. Knowing the composition of clad material 62 and the composition of base material 58, the voltage ratio is a nondestructive measurement of thickness 64 of clad material 62.

The thickness of clad material 62 is determined by reference to a particular clad material-base material voltage ratio chart on the scale adjacent the intersection of the voltage ratio and the composition of clad material 62. A clad material-base material voltage ratio chart is shown as FIG. 3 using the left ordinant scale for stainless steel cladding, spanning a range of ferrite numbers, over a carbon steel base. The clad material-base material voltage ratio charts are made using a number of test blocks for which the composition of the clad material, the thickness of the clad material and the composition of the base material are known. For a given composition of the base material, the test blocks span a range of clad material compositions and a range of clad material thicknesses. The voltage ratio is recorded when a voltage is applied to the primary winding and each test block, one at a time, is placed across the air gap of incomplete core-type transformer 54. The voltage ratio ranges from 0 to the turns ratio.

Figure 2:
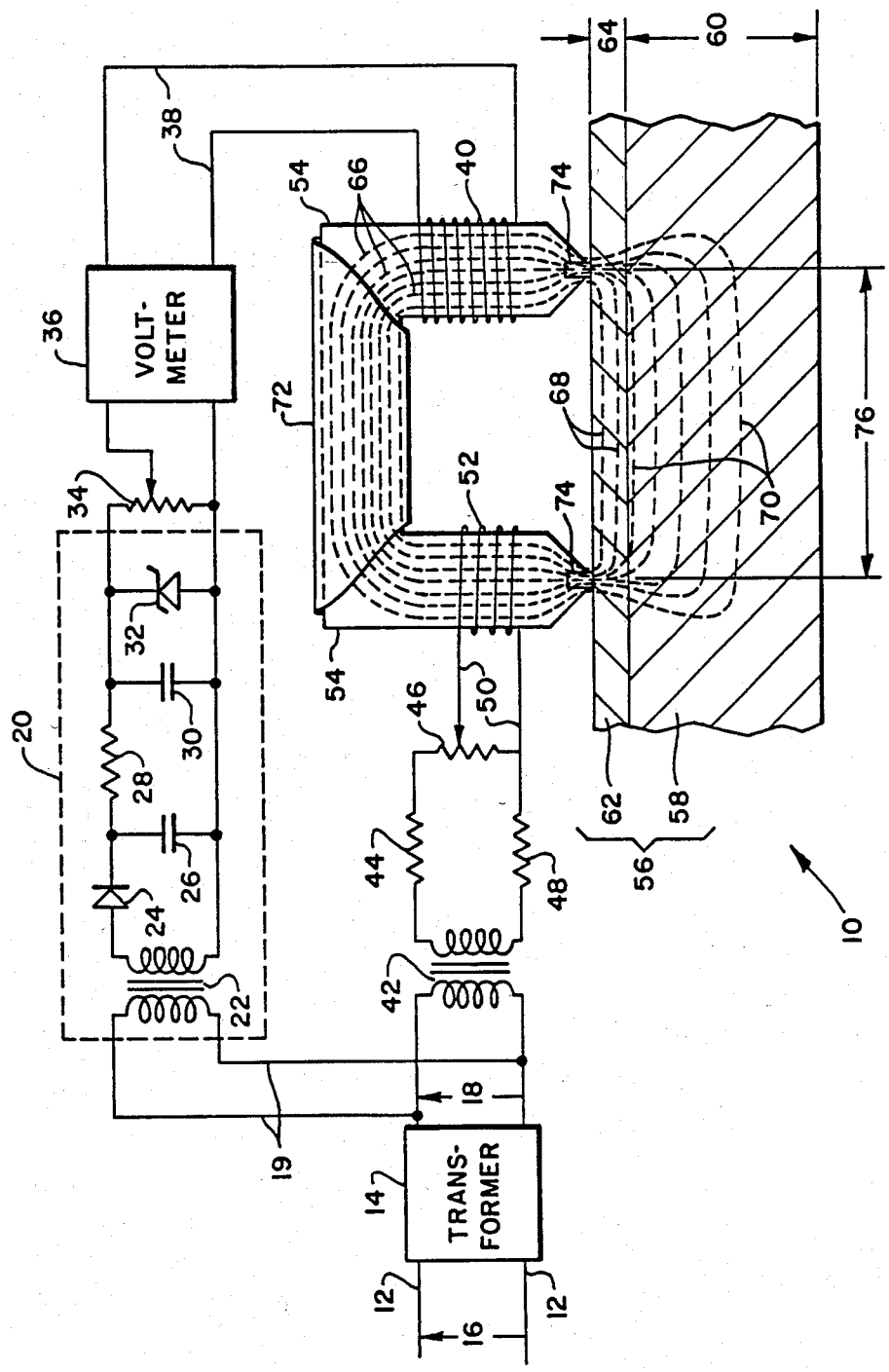
FIG. 2 is a schematic diagram of an alternate embodiment where the voltage applied to the primary winding is maintained constant.

FIG. 2 is a schematic diagram showing a preferred embodiment of clad thickness measuring apparatus 10 in which the voltage applied to primary winding 50 is maintained constant. Conductors 12 connect constant voltage output transformer 14 to alternating current voltage source 16. 60 hertz alternating current voltage source 16 is nominally 117 volts root-mean-square (RMS). Constant voltage output transformer 14 absorbs changes in the voltage of alternating current voltage source 16 over the range of 105 volts to 130 volts and maintains output voltage 18 unchanged at 117 volts RMS.

Power supply 20 is a halfwave rectifier that produces a constant direct current (DC) output voltage. The primary winding of stepdown transformer 22 is connected across voltage source 18 by leads 19. 12.6 volts alternating current (AC) are induced in the secondary winding of stepdown transformer 22. The anode of diode 24 is connected to the first lead of the secondary winding of stepdown transformer 22. Capacitor 26, resistor 28 and capacitor 30 comprise a pi filter. The halfwave rectified voltage supplied to the pi filter across the cathode of diode 24 to the second lead of the secondary winding of stepdown transformer 22 is filtered to remove unwanted ripple or variation in the voltage before the DC voltage is applied to the load. Capacitor 26 is a 25 microfarad capacitor, resistor 28 is a 500 ohm resistor, and capacitor 30 is a 25 microfarad capacitor.

Zener diode 32 is connected in parallel with capacitor 30. Zener diode 32 has a breakdown voltage of 9.1 volts which is below any ripple remaining on the filtered voltage across capacitor 30. This results in a constant DC voltage of 9.1 volts across zero adjustment potentiometer 34. Zero adjustment potentiometer 34 is a ten turn 25 kilohm resistor. The wiper to common terminal voltage of zero adjustment potentiometer 34 is applied to power voltmeter 36. The second lead of the secondary winding of stepdown transformer 22 is also connected to voltmeter 36. Voltmeter 36 is a digital voltmeter with a 3½ digit display measuring true RMS voltage. Leads 38 connect secondary winding 40 to the voltage measuring terminals of digital voltmeter 36.

The primary winding of stepdown transformer 42 is connected across constant voltage source 18. The 6.3 volts AC induced in the secondary winding of stepdown transformer 42 are applied across three series resistors. First current limiting resistor 44 is 20 ohms, gain adjustment potentiometer 46 is a ten turn, 25 ohm potentiometer, and second current limiting resistor 48 is a 20 ohm resistor. Leads 50 apply the voltage across the wiper to common terminal of gain adjustment potentiometer 46 to primary winding 52.

Primary winding 52 is shown surrounding a portion of incomplete core 54. A voltage applied across primary winding 52 causes a current to flow in primary winding 52 which in turn causes a magnetic field to be established in incomplete core 54. The magnetic flux circuit is completed by the material being clad-thickness measured 56. The material being clad-thickness measured 56 consists of base material 58 of base material thickness 60 and clad material 62 of clad material thickness 64. All lines of flux 66 pass through incomplete core 54. To complete the magnetic circuit a portion of lines of flux 66, lines of flux 68, pass through clad material 62. The remainder of lines of flux 66, lines of flux 70, pass through clad material 62, through base material 58 and through clad material 62 again. This results in two parallel flux paths in material being clad-thickness measured 56.

Incomplete core 54 is made from a laminated transformer core. All laminations in the laminated core construction of incomplete core 54 are U-shaped and identical. The uniform cross-section width in each of the three legs of the laminations is 0.9 centimeters (0.36 inch). The laminations stack to a depth of 0.9 centimeters (0.36 inch). The depth of stacked laminations affects the gain and therefore the clad material-base material charts that will be discussed below.

Incomplete core 54 consists of three legs of a feromagnetic material. Primary winding 52 having 300 turns is wound around the first leg. Handle 72 is mounted on and insulated from the second leg of incomplete core 54. Secondary winding 40 having 600 turns is wound around the third leg of incomplete core 54. The end of the first leg and the end of the third leg not connected to the second leg form an air gap in the flux path and are tapered. The tapered ends form a V-shape. The apex of the V-shape of the first and third legs of incomplete core 54 form parallel line segments that contact the material being clad-thickness measured. The parallel line segments are substantially perpendicular to the plane of all of the individual core laminations. The length of the line segments is substantially the depth of the stack laminations. To eliminate wear of the laminations at the apex, an insert of a material selected for its wear properties is inserted in the apex of the tapered ends forming wear elements 74. Tungsten, 304 stainless steel or stellite inserts are used.

Tapering the ends of the first and thirds legs of incomplete core 54 to form line segments substantially perpendicular to the plane of any of the laminations concentrates the lines of flux where incomplete core 54 contacts material being clad-thickness measured 56. The distance between the wear resistant inserts established a specific length of material being clad-thickness measured 56 through which a magnetic field is established. The depth of core 54 establishes the width of the magnetic field. The distance between wear elements 74, distance 76, is 2.5 centimeters (one inch). The clad material-base material charts discussed below are dependent on this distance and all incomplete core-type transformers for use with the same chart must have the same distance between the tapered ends. To assure repeatability, all incomplete core-type transformers using the same clad material-base material charts should have the same V-shaped tapered ends. The tapered ends also facilitate clad thickness measurements on a curved surface.

Unlike surface resistance measurements which pass electric current through a material to determine surface resistance of the material, this invention passes magnetic lines of flux through material 56 to nondestructively determine the thickness 64 of clad material 62.

This invention is used by applying an alternating voltage from alternating voltage source 18 through stepdown transformer 42 and gain adjustment potentiometer 46 to primary winding 52. While maintaining incomplete core 54 away from the influence of magnetic materials, zero adjustment potentiometer 34 is adjusted until voltmeter 36 indicates zero voltage induced in secondary winding 40. Maintaining incomplete core 54 away from the influence of magnetic materials can be accomplished by holding incomplete core 54 in air away from magnetic materials or placing a nonmagnetic material across the air gap in contact with wear elements 74. During zero adjustment, the permeance between wear elements 74 is smallest, or since reluctance is the reciprocal or permeance, the reluctance to the magnetic lines of force between wear elements 74 is greatest.

The gain is adjusted by placing a highly magnetic flux conductive material, such as carbon steel, across the air gap of incomplete core 54 in contact with wear elements 74. The permeability of the highly flux conductive material should be at least as high as the permeability of the base material being tested. Gain adjustment potentiometer 46 is adjusted until voltmeter 36 indicates 500 millivolts are induced in secondary winding 40. A highly magnetic flux conductive material provides the lowest reluctance to the magnetic lines of force between wear elements 74.

If the zero adjustment and gain adjustment are not independent, it may be necessary to repeat the zero adjustment and gain adjustment several times. Zero and gain adjustments are made until voltmeter 36 indicates zero volts induced in secondary winding 40 when incomplete core 54 is positioned away from the influence of magnetic materials and voltmeter 36 indicates 500 millivolts induced in secondary winding 40 when a highly magnetic flux conductive material is placed across the air gap in contact with wear elements 74. It is not important that the numerical value of the alternating current voltage applied to primary winding 52 be known. It need only be known that the voltage applied to primary winding 52 remains constant and that the voltage induced in secondary winding 40 is zero when the reluctance is greatest between wear elements 74 and 500 millivolts when the reluctance is lowest between wear elements 74. Once adjusted to these conditions, zero adjustment potentiometer 34 and gain adjustment potentiometer 46 remain unchanged for the duration of the use of clad thickness measuring apparatus 10.

With the above adjustments completed, a test block of known cladding thickness, of known clad material and of known base material is placed across wear elements 74 of incomplete core 54. The voltage induced in secondary winding 40 as indicated by voltmeter 36 is recorded. Additional test blocks of known cladding thickness, clad material and base material, spanning a range of clad material compositions and a range of clad material thicknesses, are placed across wear elements 74 and the voltage induced in secondary winding 40 recorded. This results in a series of points, one for each test block. The test points are connected to form curves. A series of curves results in a clad material-base material chart.

Figure 3:
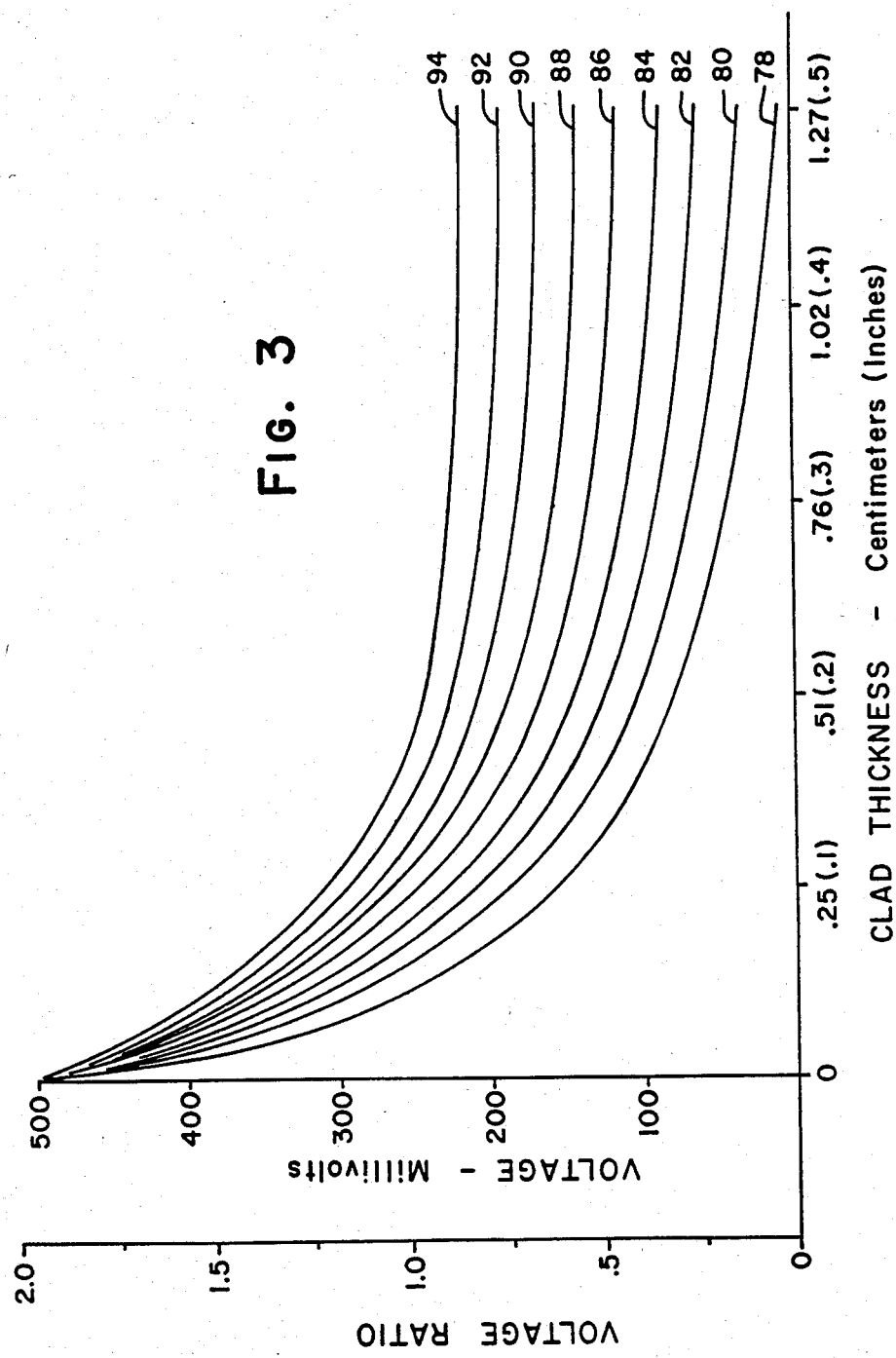
FIG. 3 is a particular clad material-base material chart showing the relationship between the voltage induced in the secondary winding and the clad thickness for a one inch air gap for stainless steel cladding over a range of ferrite numbers with carbon steel base.

FIG. 3 shows a clad material-base material chart for stainless steel clad over a carbon steel base. Nine curves are shown. The clad thickness ranges from 0 to 1.27 centimeters (0 to 0.5 inch). The clad material composition is indicated by ferrite numbers which range from 0 through 16. Curves 78, 80, 82, 84, 86, 88, 90, 92 and 94 are shown for clad material with 0, 2, 4, 6, 8, 10, 12, 14 and 16 ferrite number, respectively. Curves 78 through 94 cover the range of ferrite numbers used extensively in cladding. A clad material-base material chart containing curves similar to curves 78 through 94 can be prepared for a variety of clad material-base material combinations.

With the zero and gain adjustments completed, and a clad material-base material chart prepared, incomplete core 54 is placed on material to be clad-thickness measured 56 with wear elements 74 in contact with material to be clad-thickness measured 56. The voltage induced in secondary winding 40 as indicated by voltmeter 36 is noted. The ferrite content of the cladding material is measured using any known means. Knowing the base material, the ferrite number of the clad material and the voltage induced in secondary winding 40, reference is made the clad material-base material chart similar to FIG. 3 for the appropriate base material. Entering the chart on the ordinant at the voltage induced in secondary winding 40, the clad thickness is read from the abscissa scale below the intersection of the voltage induced in secondary winding 40 and the curve representing the ferrite number of the clad material. It may be necessary to interpolate for intermediate ferrite numbers.

The magnitude of the voltage induced in secondary winding 40 is dependent on the voltage applied to primary winding 52, the turns ratio between primary winding 52 and secondary winding 40 and the reluctance of the flux path interlinking primary winding 52 and secondary winding 40. The voltage applied to primary winding 52 is established when gain adjustment potentiometer 46 is adjusted and remains constant throughout the testing. Primary winding 52 has 300 turns; secondary winding 40 has 600 turns. The turns ratio, the ratio of the number of turns in secondary winding 40 to the number of turns in primary winding 52, is constant. The only variable is the reluctance of the flux path interlinking primary winding 52 and secondary winding 40. The flux path consists of three ferromagnetic legs of incomplete core 54 and material being clad-thickness measured 56. The reluctance of the three ferromagnetic legs of incomplete core 54 remain constant. The reluctance of material being clad thickness measured 56 is dependent on the composition of cladding 62, the thickness 64 of the clad material and the composition of base material 58.

A magnetic flux conductive clad material 62 of a given permeability over a magnetic flux condutive base material 58 of a different permeability, when placed across the air gap of incomplete core 54, provides parallel magnetic flux paths through material being clad-thickness measured 56 between wear elements 74. The two parallel reluctances are combined to form an equivalent reluctance. The equivalent reluctance of material being clad-thickness measured 56 is dependent on the composition of the clad material, the thickness of the clad material and the composition of the base material. Each combination of these three variables, composition of clad material, thickness of clad material, and composition of base material, causes a predictable voltage to be induced in secondary winding 40 for a known voltage applied to primary winding 52. The relationship among these variables is graphically presented in the clad material-base material chart of FIG. 3. Knowing the composition of clad material 62 and the composition of base material 58, the voltage induced in secondary winding 40 is thereby a nondestructive measurement of clad material thickness 64.

When using the clad material-base material chart of FIG. 3, the composition of the clad material is determined by the the ferrite number.

Clad materials up to a thickness of 0.054 centimeters (0.025 inches) have been applied to base materials ranging from 10 centimeters to 25 centimeters (4 inches to 10 inches). In these applications, thickness 60 of base material 58 has not influenced the voltage induced in secondary winding 40.

An incomplete core-type transformer is useful to determine clad thickness up to one-half of distance 76. It is recommended that use of an incomplete core-type transformer be used to determine clad thickness up to only one-fourth of distance 76. To measure thicker clad materials, an incomplete core-type transformer with a larger distance 76 should be constructed.

Increased sensitivity can be achieved by increasing the turns ratio. Of course, this requires a corresponding clad material-base material chart.

Flaws such as cracks are generally detected in clad material 62 prior to the thickness measuring the clad material. Therefore, it is not necessary to ascertain the effects of flaws on the operation of clad thickness measuring apparatus 10.

It is generally adequate to spot check cladding that has been machined or ground to determine the thickness of the clad material. However, a grid can be established on the workpiece and a clad thickness measurement taken from each quadrangle of the grid.

Clad thickness measuring apparatus 10 has been described above in applications where a clad material has been applied over a base material and the permeability of both the clad material and the base material, though different, are relatively high. Clad thickness measuring apparatus 10 can also be used to measure clad thickness when the permeability of the clad material is substantially lower then the permeability of the base material, such as when measuring the thickness of paint on a metal base. In applications where the permeability of the clad material is substantially lower than the permeability of the base material, clad thickness measuring apparatus 10 has been found to be effective over approximately the same range of clad thicknesses as where the permeability of both the clad material and base material are relatively high.

I claim:

1. An apparatus for determining the thickness of a magnetic flux conductive clad material over a magnetic flux conductive base material of a different permeability comprising:

a constant voltage alternating current power source;

a first voltage divider having a first terminal, a second terminal and a divided voltage terminal, said first terminal and said second terminal of said first voltage divider connected to said constant voltage alternating current power source;

an incomplete transformer core having a primary winding surrounding a portion thereof, a secondary winding surrounding a portion thereof, and first and second spaced legs having corresponding tapered first and second ends forming line segments at the apex of the taper, the length of the line segments being substantially the depth of the incomplete transformer core, the line segments perpendicular to the plane of the incomplete transformer core for contacting the material being clad-thickness measured, thereby completing a magnetic flux circuit through the incomplete transformer core and the material being clad-thickness measured and providing two line segment contacts a predetermined distance apart for establishing in the material being clad-thickness measured a magnetic field over a specific length and width;

means for connecting said divided voltage terminal and said second terminal of said first voltage divider to said primary winding of said incomplete transformer core;

means for supplying a constant direct current voltage;

a second voltage divider having a first terminal, a second terminal and a divided voltage terminal, said first terminal and said second terminal of said second voltage divider connected to said constant direct current voltage means;

means for measuring voltage;

means for connecting said divided voltage terminal and said second terminal of said second voltage divider to said voltage measuring means to provide power thereto; and means for connecting said secondary winding to said voltage measuring means, whereby said voltage measuring means measures the voltage induced in said secondary winding when a voltage is applied to said primary winding and a magnetic flux conductive clad material over a magnetic flux conductive base material of different permeability is placed in contact with the first and second ends completing the magnetic flux circuit.

2. An apparatus for determining the thickness of a magnetic flux conductive clad material over a magnetic flux conductive base material of different permeability as recited in claim 1 wherein:

an insert of wear resistant material is inserted in the end of said tapered ends.

3. An apparatus for determining the thickness of a magnetic flux conductive clad material over a magnetic flux conductive base material of a different permeability as recited in claim 1 wherein:

the permeability of the magnetic flux conductive base material is greater than the permeability of the magnetic flux conductive clad material.

* * * * *